(12) United States Patent
Ikeda

(10) Patent No.: US 8,857,483 B2
(45) Date of Patent: Oct. 14, 2014

(54) STUDLESS TIRE

(75) Inventor: Akio Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 911 days.

(21) Appl. No.: 12/372,480

(22) Filed: Feb. 17, 2009

(65) Prior Publication Data

US 2009/0229721 A1 Sep. 17, 2009

(30) Foreign Application Priority Data

Mar. 12, 2008 (JP) ................. 2008-062034

(51) Int. Cl.
| | | |
|---|---|---|
| B60C 11/11 | (2006.01) | |
| B60C 11/12 | (2006.01) | |
| B60C 11/03 | (2006.01) | |
| B60C 11/13 | (2006.01) | |

(52) U.S. Cl.
CPC ..... *B60C 11/1369* (2013.01); *B60C 2011/1213* (2013.01); *B60C 11/033* (2013.01); *B60C 2011/0388* (2013.01); *B60C 11/0306* (2013.01); *B60C 11/11* (2013.01); *B60C 11/12* (2013.01); *B60C 11/0309* (2013.01); *Y10S 152/902* (2013.01); *Y10S 152/03* (2013.01)
USPC ............ 152/209.18; 152/209.22; 152/209.27; 152/902; 152/DIG. 3

(58) Field of Classification Search
CPC ............ B60C 11/0306; B60C 11/0309; B60C 11/033; B60C 11/11; B60C 11/12; B60C 11/1369; B60C 2011/0348; B60C 2011/1213; B60C 2011/0388
USPC .................. 152/209.18, 209.27, 902, DIG. 3, 152/209.22
See application file for complete search history.

(56) References Cited

U.S. PATENT DOCUMENTS 4,545,415 A * 10/1985 Lindner et al. ............. 152/209.1
5,361,816 A * 11/1994 Hitzky ..................... 152/209.22
(Continued)

FOREIGN PATENT DOCUMENTS

| JP | 2000-225814 A | * | 8/2000 |
| JP | 2003-63211 A | | 3/2003 |
| JP | 2005-280455 | * | 10/2005 |

OTHER PUBLICATIONS

Machine translation for Japan 2005-280455 (no date).*

(Continued)

*Primary Examiner* — Steven D Maki
(74) *Attorney, Agent, or Firm* — Birch, Stewart, Kolasch & Birch, LLP

(57) ABSTRACT

A studless tire improved in on-ice performance as well as on-snow performance is disclosed. The tread portion is provided with tread grooves to have a land ratio in a range of from 0.65 to 0.75. The tread grooves including an axially inner circumferential groove, an axially outer circumferential groove and a plurality of sipes disposed on each side of the tire equator. The land ratio of a crown region and the land ratio of a shoulder region are each larger than the land ratio of a middle region, wherein the crown region is defined between the widthwise center lines of the inner circumferential grooves, the middle region is defined between the widthwise center line of the axially inner circumferential groove and the widthwise center line of the axially outer circumferential groove, and the shoulder region is defined between the widthwise center line of the outer circumferential groove and a tread edge of the tread portion.

10 Claims, 4 Drawing Sheets

(56) References Cited

U.S. PATENT DOCUMENTS

| | | | |
|---|---|---|---|
| 6,499,520 B1* | 12/2002 | Yoshioka et al. | 152/209.26 |
| 6,571,844 B1* | 6/2003 | Ochi et al. | 152/209.27 |
| 7,137,424 B2 | 11/2006 | Hino | |
| 2006/0027296 A1* | 2/2006 | Tsubono et al. | 152/DIG. 003 |
| 2006/0032566 A1* | 2/2006 | Koya | 152/209.18 |
| 2007/0089821 A1* | 4/2007 | Kishizoe | 152/209.2 |
| 2008/0196808 A1* | 8/2008 | Ikeda et al. | 152/209.18 |
| 2008/0202658 A1* | 8/2008 | Ikeda et al. | 152/209.27 |
| 2008/0223495 A1* | 9/2008 | Ikeda et al. | 152/209.16 |
| 2009/0277550 A1* | 11/2009 | Ikeda | 152/209.18 |
| 2010/0126645 A1* | 5/2010 | Barboza et al. | 152/209.11 |

OTHER PUBLICATIONS

Machine translation for Japan 2000-225814 (no date).*

* cited by examiner

STUDLESS TIRE

BACKGROUND OF THE INVENTION

The present invention relates to a studless tire, more particularly to a tread structure capable of improving on-ice performance as well as on-snow performance.

There have been proposed a variety of studless tires designed for use on icy roads and snowy roads for example as disclosed in U.S. Pat. No. 7,137,424 (JP-2003-63211-A). In the case of a studless tire, in order to provide traction and braking power on the icy roads, a large number of sipes are formed on tread elements such as block and rib since the sipes absorb and eliminate a water film on the icy road surface and increase the friction with the road surface. In order to improve the on-ice performance of a studless tire, it is necessary to increase the ground contacting area to increase the frictional force on the icy roads. On the other hand, in order to improve on-snow performance, it is necessary to increase the grooved area to increase the shear strength of snow column (snow grip). Here, the snow column is the snow on the road surface trodden by the tire and entered into the tread groove like a column rising from the road surface. As just described, to improve the on-ice performance and to improve the on-snow performance are contradictory problems.

SUMMARY OF THE INVENTION

It is therefore, an object of the present invention to provide a studless tire, in which on-ice performance can be improved without deteriorating on-snow performance.

According to the present invention, a studless tire comprises a tread portion provided with tread grooves to have a land ratio in a range of from 0.65 to 0.75, the tread grooves including an axially inner circumferential groove, an axially outer circumferential groove and a plurality of sipes disposed on each side of the tire equator, and the land ratio of a crown region and the land ratio of a shoulder region are each larger than the land ratio of a middle region, wherein the crown region is defined between the widthwise center lines of the inner circumferential grooves, the middle region is defined between the widthwise center line of the axially inner circumferential groove and the widthwise center line of the axially outer circumferential groove, and the shoulder region is defined between the widthwise center line of the outer circumferential groove and a tread edge of the tread portion.

Preferably, the difference in the land ratio between the crown region and the middle region is not more than 0.15, and the difference in the land ratio between the shoulder region and the middle region is not more than 0.15.

The axial distance between the widthwise center line of the inner circumferential groove and the tire equator is not less than 6.0% and not more than 10.0% of the tread width, and the axial distance between the widthwise center line of the outer circumferential groove and the tire equator is not less than 28.0% and not more than 35.0% of the tread width.

During straight running, a road surface mainly contacts with the crown region, therefore, by setting the land ratio of the crown region larger than that of the middle region, the ground contacting area is increased to increase the frictional force on icy roads. Thus, traction and braking power are increased and on-ice performance during straight running can be improved.

On the other hand, during cornering, a road surface mainly contacts with the shoulder region, therefore, by setting the land ratio of the shoulder region more than that of the middle region, the ground contacting area is increased to increase the frictional force on icy roads. Thus, cornering performance on icy roads can be improved.

Further, since the land ratio of the middle region is made smallest while limiting the land ratio of the entire tread portion in a particular range of 0.65 to 0.75, a grooved area necessary for running on snowy roads is secured.

Therefore, the studless tire according to the present invention can be improved in the on-ice performance as well as on-snow performance.

DEFINITION

In this specification, various dimensions, positions and the like refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The undermentioned tread edges E are the axial outermost edges of the ground contacting patch (at camber angle=0) in the normally inflated loaded condition, and the tread width TW is the axial distance between the tread edges E.

DESCRIPTION OF THE PREFERRED EMBODIMENTS

Figure 1:
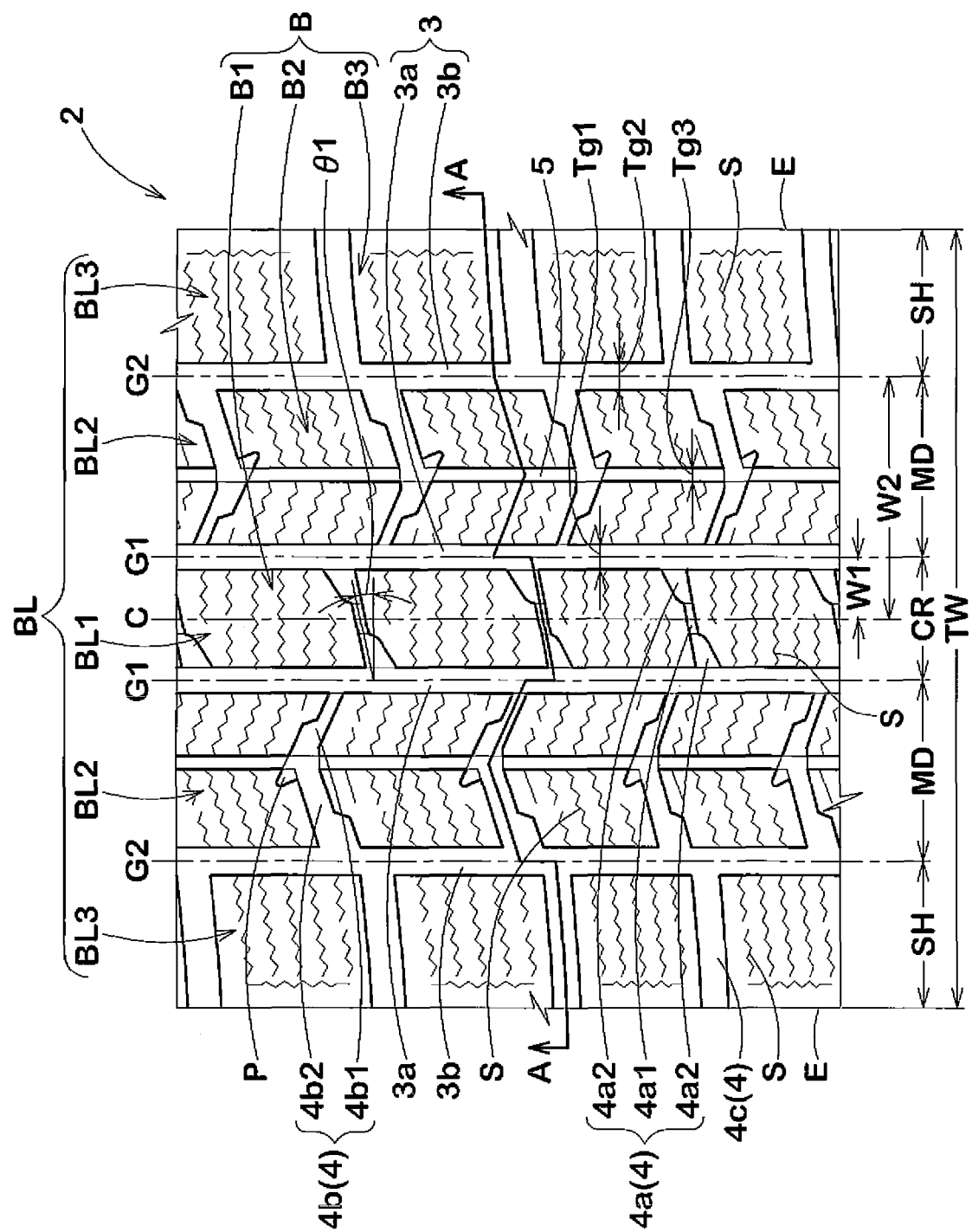
FIG. 1 is a partial developed plan view of a studless tire according to the present invention, showing an example of the tread pattern.

Embodiments of the present invention will now be described in detail in conjunction with the accompanying drawings.

The studless tire according to the present invention is a pneumatic tire which, as well known in the art, comprises a tread portion 2, a pair of axially spaced bead portions and a pair of sidewall portions, and which is reinforced by a carcass (e.g. radial ply carcass) extending between the bead portions through the tread portion and sidewall portions, a belt (breaker and/or band) disposed radially outside the carcass in the tread portion, and a bead core disposed in each of the bead portions. In this embodiment, the tire is a radial tire for passenger cars.

The tread portion 2 is provided with tread grooves forming a tread pattern. The tread grooves include at least four circumferential grooves 3 extending continuously in the tire circumferential direction, and a plurality of axial grooves 4.

The four circumferential grooves 3 are:
a pair of axially inner circumferential grooves 3a disposed one on each side of the tire equator C; and
a pair of axially outer circumferential grooves 3b disposed one between one of the inner circumferential grooves 3a and the adjacent tread edge E. The circumferential grooves 3 can be formed with a straight configuration and/or a zigzag configuration.

The above-mentioned axial grooves 4 are:
crown axial grooves 4a extending across the entire width between the two inner circumferential grooves 3a;
middle axial grooves 4b disposed on each side of the tire equator and extending across the entire width between the inner circumferential groove 3a and outer circumferential groove 3b; and
shoulder axial grooves 4c disposed on each side of the tire equator and extending across the entire width between the outer circumferential groove 3b and the tread edge E.

By the two inner circumferential grooves 3a and the crown axial grooves 4a therebetween, a row BL1 of circumferentially arranged crown blocks B1 is formed along the tire equator C.

By the axially inner and outer circumferential grooves 3a and 3b and the middle axial grooves 4b therebetween, a row BL2 of circumferentially arranged middle blocks B2 is formed on each side of the tire equator C.

By the axially outer circumferential grooves 3b and the shoulder axial grooves 4c extending to the tread edges E, a row BL3 of circumferentially arranged shoulder blocks B3 is formed on each side of the tire equator C.

The blocks B1-B3 are provided with a plurality of sipes S or very fine grooves having a groove width of from about 0.3 to 1.0 mm.

Figure 3:
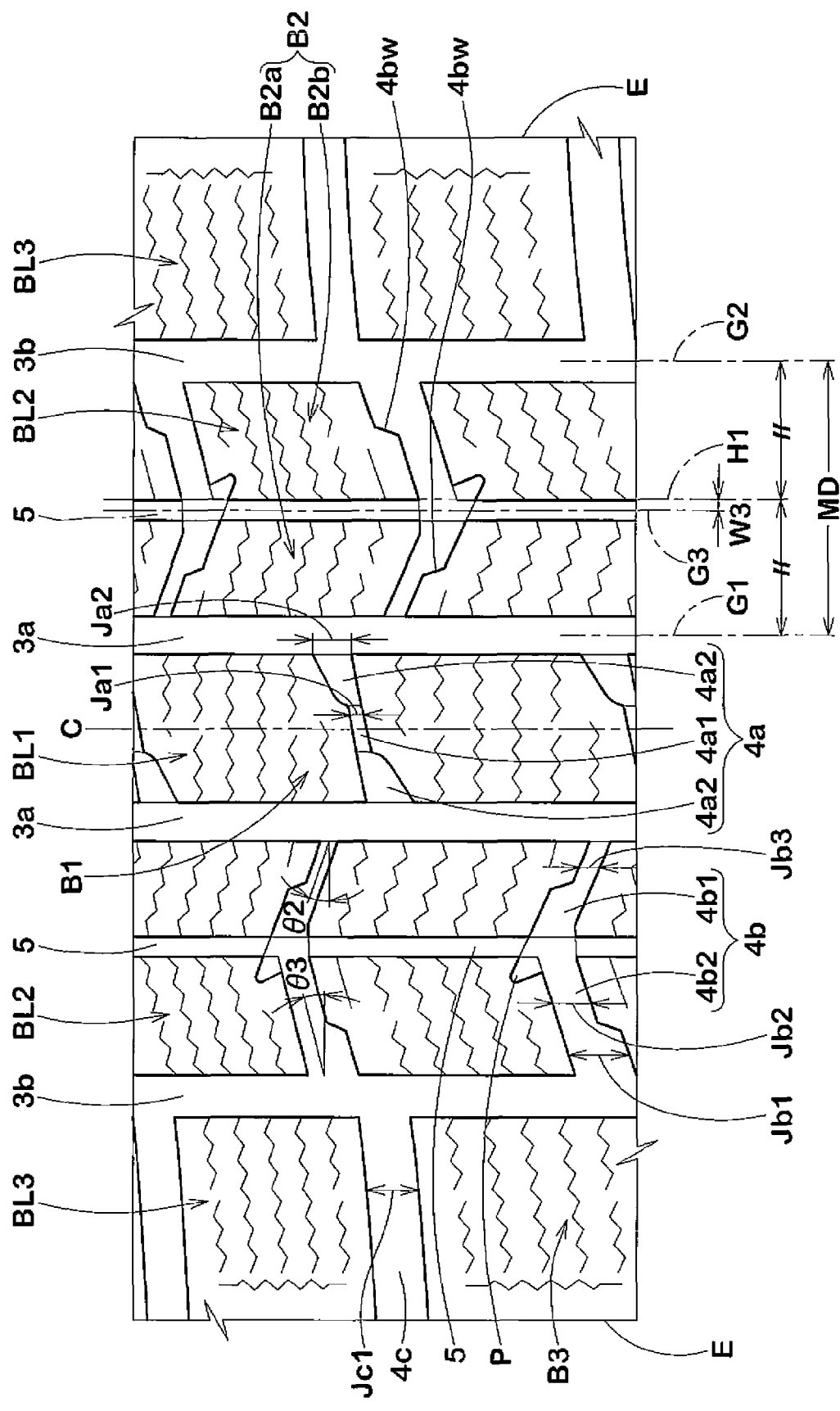
FIG. 3 is an enlarged view of the tread pattern shown in FIG. 1.
Figure 4:
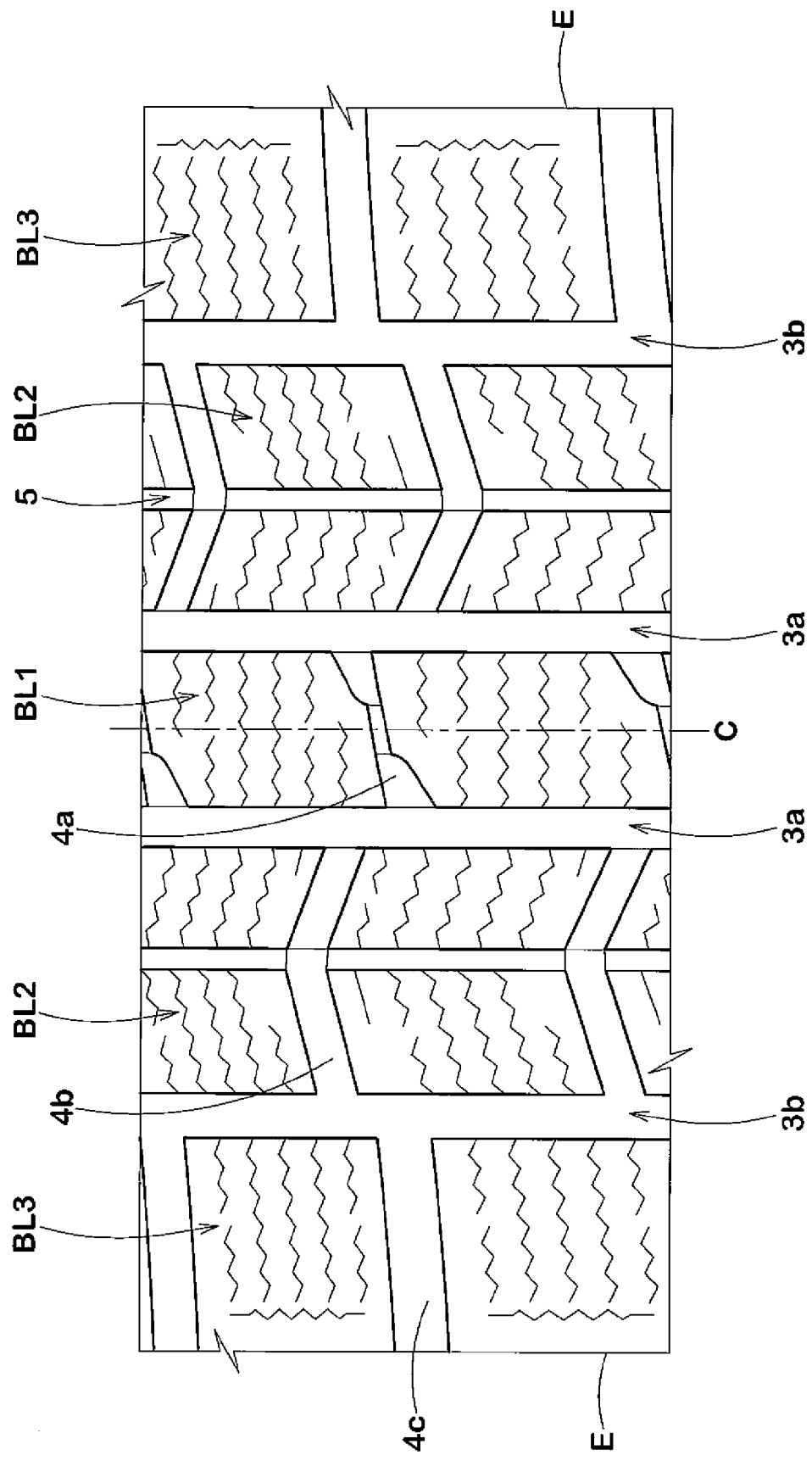
FIG. 4 is an enlarged view of another example of the tread pattern.

In the embodiments shown in FIG. 3 and FIG. 4, the tread portion 2 is not provided with another type of ground contacting elements such as rib (namely, circumferentially continuous element), therefore, the tread patterns are block patterns made up of only a plurality of circumferential rows BL of blocks B. Each of the tread patterns is a bidirectional pattern substantially symmetrical about any point on the tire equator C, but it is not always necessary. It can be an unidirectional pattern.

All of the circumferential grooves 3 are formed as straight grooves so that snow packed in the grooves 3 is easily ejected during running.

In order to obtain a sufficient ground contacting area while keeping necessary snow-ejecting performance, the widths Tg1 and Tg2 of the inner and outer circumferential grooves 3a and 3b measured in the tire axial direction are preferably set in a range of not less than 3 mm, more preferably not less than 4 mm, but not more than 8 mm, more preferably not more than 7 mm. Since the outer circumferential grooves 3b affects the on-snow performance more than the inner circumferential grooves 3a, in order to promote the improvement in the on-snow performance, the groove width Tg2 of the outer circumferential groove 3b is set to be more than the groove width Tg1 of the inner circumferential groove 3a.

Further, in order to improve the ejecting of the snow from the groove, the groove depths Ug1 and Ug2 of the circumferential grooves 3a and 3b are preferably set in a range of not less than 7 mm, more preferably not less than 8 mm, but not more than 11 mm, more preferably not more than 10 mm.

The blocks B are each provided with a plurality of sipes S. If the depths of the sipes are less than 3.0 mm, there is a possibility that an edge effect on icy roads becomes insufficient, therefore, the depths of the sipes are preferably set in a range of not less than 3.0 mm, preferably not less than 5.0 mm. But, in order to provide necessary rigidity for the blocks B, the depths of the sipes S are preferably not more than 100%, more preferably not more than 80% of the maximum depth of the adjacent axial grooves 4.

According to the present invention, the land ratio is peculiarly defined for the entirety and particular regions of the tread portion. The land ratio means a ratio of the total ground contacting area to the gross area of the region/portion concerned. Here, a crown region CR is defined as the region between the widthwise center lines G1 of the two inner circumferential grooves 3a; a middle region MD is defined as the region on each side of the tire equator between the widthwise center line G1 of the inner circumferential groove 3a and the widthwise center line G2 of the outer circumferential groove 3b; and a shoulder region SH is defined as the region on each side of the tire equator between the widthwise center line G2 of the outer circumferential groove 3b and the tread edge E.

In the case that the circumferential groove 3 is zigzag, the widthwise center line thereof is defined by a circumferential line extending straight at the center of the amplitude of the zigzag.

The land ratio of the middle region MD is set to be smaller than that of the crown region CR and also smaller than that of the shoulder region SH.

The land ratio of the tread portion 2 is set in a range of not less than 0.65, preferably not less than 0.67, more preferably not less than 0.68, but not more than 0.75, preferably not more than 0.73, more preferably not more than 0.72. Thereby, a grooved area necessary for running on snowy roads can be secured and the snow ejecting performance can be improved.

By setting the land ratio of the crown region CR more than that of the middle region MD, it becomes possible to secure a wide ground contacting area during straight running.

By setting the land ratio of the shoulder region SH more than that of the middle region MD, it becomes possible to secure a wide ground contacting area during cornering.

Accordingly, the frictional force between the tread portion 2 and icy roads during straight running and cornering can be increased, and the on-ice performance of the tire can be improved. Thus, the tire is improved in the on-ice performance while maintaining the on-snow performance.

If the land ratio of the tread portion 2 is less than 0.65, it becomes difficult to improve the on-ice performance. If more than 0.75, the on-snow performance considerably deteriorates.

In order to secure a sufficient ground contacting area during straight running, the land ratio of the crown region CR is preferably set in a range of not less than 0.72, more preferably not less than 0.73, but not more than 0.78, more preferably not more than 0.77.

In order to secure a sufficient grooved area for the tread portion 2 without sacrificing the on-ice performance, the land ratio of the middle region MD is preferably set in a range of from not less than 0.63, more preferably not less than 0.64, but not more than 0.69, more preferably not more than 0.68.

In order to secure a sufficient ground contacting area during cornering, the land ratio of the shoulder region SH is preferably set in a range of not less than 0.70, more preferably not less than 0.71, but not more than 0.78, more preferably not more than 0.77.

By setting the land ratios as above, the rigidity difference between the regions CR, MD and SH can be optimized, and as a result, uneven wear of the blocks B can be prevented.

If the difference between the land ratios is small, it is difficult to strike a balance between the on-snow performance and on-ice performance, therefore, it is preferable that the difference in the land ratio between the middle region MD and the crown region CR is not more than 0.15, more preferably not more than 0.14, but not less than 0.05, more preferably not less than 0.06, and also the difference in the land ratio between the middle region MD and the shoulder region SH is not more than 0.15, more preferably not more than 0.14, but not less than 0.05, more preferably not less than 0.06.

In connection with the axial widths of the regions CR, MD and SH, the axial distance W1 of the widthwise center line G1 of each of the inner circumferential grooves 3a from the tire equator C is preferably set in a range of not less than 6.0%, more preferably not less than 7.0%, but not more than 10.0%, more preferably not more than 9.0% of the tread width TW. The axial distance W2 of the widthwise center line G2 of each of the outer circumferential grooves 3b from the tire equator C is preferably set in a range of not less than 28.0%, more preferably not less than 29.0%, but not more than 35.0%, more preferably not more than 34.0% of the tread width TW.

If the distance W1 is less than 6.0% of the tread width TW, it becomes difficult to effectively improve the on-ice performance during straight running. If the distance W1 is more than 10.0%, the snow ejecting performance tends to decrease.

If the distance W2 is more than 35.0%, it is difficult to improve the on-ice performance during cornering. If the distance W2 is less than 28.0%, it becomes difficult to secure the necessary grooved area in the middle region MD.

In each of the shoulder regions SH where a row BL3 of the shoulder blocks B3 is provided, in order to improve the cornering performance by increasing the lateral stiffness (rigidity) of the shoulder blocks B3, the axial length of the shoulder blocks B3 is made larger than that of the crown blocks B1.

Since the shoulder regions SH largely affect the on-snow performance in comparison with the middle region MD and crown region CR, it is effective for obtaining a larger shear strength of snow column (snow grip) to make the shoulder axial grooves 4c wider than the crown axial grooves 4a and middle axial grooves 4b. Therefore, the width Jc1 of the shoulder axial groove 4c measured in the tire circumferential direction is preferably set in a range of not less than 3 mm, more preferably not less than 4 mm, but not more than 9 mm, more preferably not more than 8 mm. Further, the depth Kc1 of the shoulder axial groove 4c is preferably set in a range of not less than 80%, more preferably not less than 90%, but not more than 100% of the groove depth Ug2 of the outer circumferential groove 3b.

In the crown region CR where a row BL1 of the crown blocks B1 is provided, the crown axial grooves 4a are inclined with respect to the tire axial direction.

In the embodiments sown in FIGS. 3 and 4, each of the crown axial grooves 4a is made up of:
a narrow central groove segment 4a1 crossing the tire equator C and having a substantially constant width; and
a pair of wide lateral groove segments 4a2 each extending from one of the ends of the narrow central groove segment 4a1 while gradually increasing the groove width.

In order to increase the axial edge component, the angle θ1 of the narrow central groove segment 4a1 is set to be more than 0 degree, preferably not less than 5 degrees, but not more than 30 degrees, more preferably not more than 25 degrees with respect to the tire axial direction.

By the provision of the wide groove segments 4a2, the axial component of the edges and the groove volume are increased, therefore, it is possible to further improve the on-ice and on-snow performances.

On the other hand, by the provision of the narrow central groove segment 4a1, the crown blocks' row BL1 can be increased in the rigidity around the tire equator C and the on-ice performance can be improved.

Preferably, the groove width Ja1 of the narrow central groove segment 4a1 measured in the tire circumferential direction is set in a range of not less than 0.5 mm, more preferably not less than 1 mm, but not more than 4 mm, more preferably not more than 3 mm. Preferably, the groove depth Ka1 of the narrow central groove segment 4a1 is set in a range of not less than 50%, more preferably not less than 55%, but not more than 90%, more preferably not more than 80% of the groove depth Ug1 of the inner circumferential groove 3a.

In order to increase the shear strength of snow column (snow grip performance), it is preferable that the maximum groove width Ja2 of the wide groove segment 4a2 measured in the tire circumferential direction is not less than 1 times, more preferably not less than 2 times, but not more than 6 times, more preferably not more than 5 times the groove width Ja1 of the narrow central groove segment 4a1, and the depth Ka2 of the wide groove segment 4a2 is more than the depth ka1 of the narrow central groove segment 4a1.

In each of the middle regions MD where a row BL2 of the middle blocks B2 is provided, an additional circumferential groove 5 is provided in the embodiments shown in FIGS. 3 and 5. The additional circumferential groove 5 is narrow and shallow when compared with the circumferential grooves 3, and thus the main function is to control the rigidity of the tread portion. The narrow circumferential groove 5 extends continuously in the tire circumferential direction across the middle blocks B2. Therefore, the middle blocks B2 is subdivided into an axially inner block piece B2a and an axially outer shoulder block piece B2b. The widthwise center line G3 of the narrow circumferential groove 5 is positioned on the tire equator C side of the widthwise center line H1 of the middle region MD, thereby the inner block piece B2a becomes smaller in the width than the outer shoulder block piece B2b, and the inner block piece B2a becomes smaller in the lateral stiffness (rigidity) than the outer shoulder block piece B2b. As a result, the magnitude relation of the lateral stiffness (rigidity) of the block rows becomes as follows: Middle block B2 row<Crown block B1 row<Shoulder block B3 row.

This rigidity distribution can improve transient characteristic when side force becomes generated for cornering and thus the lane change stability is improved.

In order to achieve the above-mentioned magnitude relation, the axial distance W3 between the widthwise center line G3 of the narrow circumferential groove 5 and the widthwise center line H1 of the middle blocks B2 is preferably set in a range of not less than 0.5 mm, more preferably not less than 1 mm, but not more than 5 mm, more preferably not more than 4 mm.

The narrow circumferential groove 5 has a groove width Tg3 in a range of not less than 20%, more preferably not less than 30%, but not more than 80%, more preferably not more than 70% of the groove width Tg1 of the inner circumferential groove 3a, and a groove depth Ug3 in a range of not less than 50%, more preferably not less than 60%, but not more than 80%, more preferably not more than 70% of the groove depth Ug1 of the inner circumferential groove 3a.

On the other hand, the middle axial grooves 4b are crossed by the narrow circumferential groove 5, and each of the middle axial grooves 4b is made up of an axially outer groove segment 4b2 extending between the narrow circumferential groove 5 and the outer circumferential groove 3b, and an axially inner groove segment 4b1 extending between the narrow circumferential groove 5 and the inner circumferential groove 3a.

The inner groove segment 4b1 and the outer groove segment 4b2 are inclined oppositely each other with respect to the tire axial direction. The inclination angles θ2 and θ3 of the inner groove segment 4b1 and outer groove segment 4b2, respectively, are preferably set in a range of not less than 1 degree, more preferably not less than 5 degrees, but not more than 30 degrees, more preferably not more than 25 degrees with respect to the tire axial direction.

Therefore, the middle axial grooves 4b are increased in the edge, and due to such bent configuration, larger frictional forces can be generated when making left-hand turn as well as right-hand turn.

The outer groove segment 4b2 affects the on-snow performance more than the inner groove segment 4b1. Therefore, it is preferable that the groove depth Kb2 of the outer groove segment 4b2 is more than the groove depth Kb1 of the inner groove segment 4b1.

Figure 2:
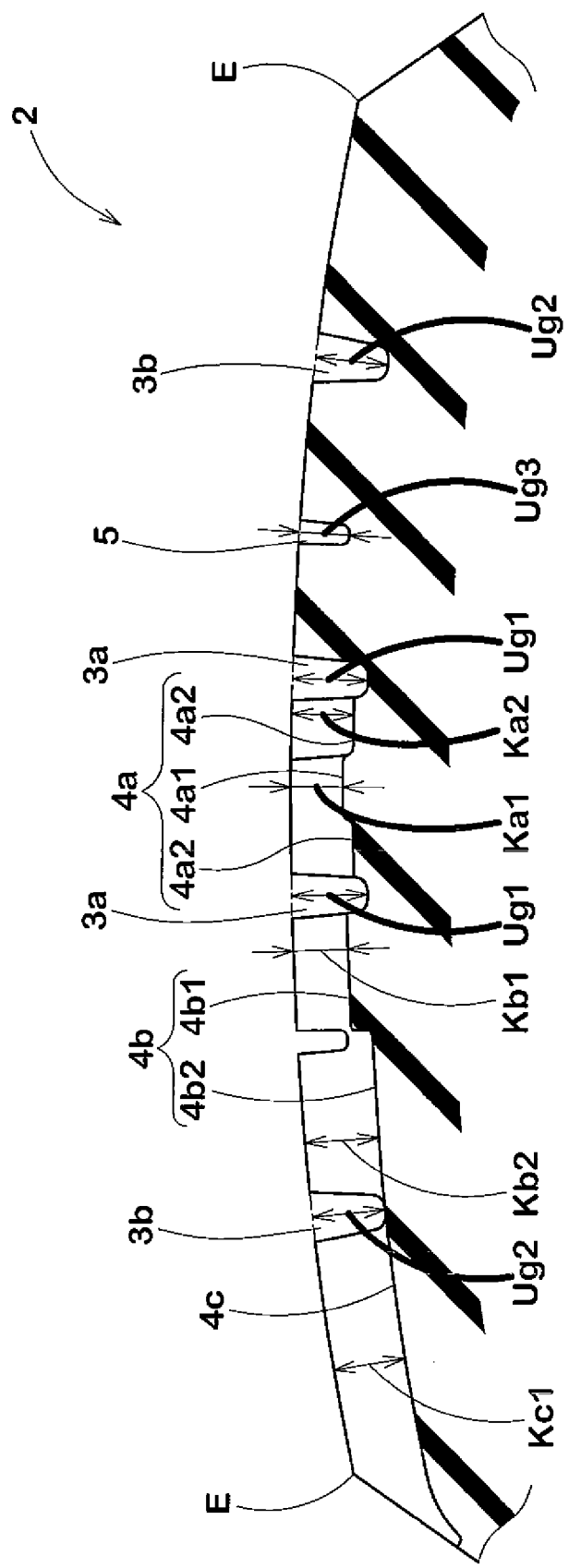
FIG. 2 is a cross sectional view of the tread portion thereof taken along line A-A in FIG. 1.

In the embodiments shown in FIGS. 3 and 4, the outer groove segment 4b2 has a substantially constant depth Kb2, and the inner groove segment 4b1 has a substantially constant depth Kb1 smaller than the depth Kb2 as shown in FIG. 2.

Preferably, the groove depth Kb2 is not less than 80%, more preferably not less than 90%, but not more than 100% of the groove depth Ug2 of the outer circumferential groove 3b. The groove depth Kb1 is preferably not less than 50%, more preferably not less than 60%, but not more than 90%, more preferably not more than 80% of the groove depth Ug2 of the outer circumferential groove 3b.

In the embodiment shown in FIG. 4, the middle axial grooves 4b have a substantially constant groove width. Excepting the groove width of the middle axial grooves 4b, the embodiment shown in FIG. 4 is the same as the embodiment shown in FIG. 3.

It is however, preferred that the groove width of the middle axial grooves 4b is decreased gradually from the outer circumferential groove 3b towards the inner circumferential groove 3a. Thereby, in the middle region MD, the land ratio is increased towards the crown region, and as a result, the on-ice performance during straight running can be improved.

Conversely, the grooved area is increased towards the shoulder region, as a result, the on-snow performance can be further improved. More preferably, the groove width is decreased or changed stepwise as shown in FIG. 3 because the groove walls are provided with bent parts 4bw which increase the groove edge and can improve the on-ice performances during straight running and cornering in a well balanced manner. Preferably, each of the middle axial grooves 4b has at least two steps of decrease in the groove width so as ro have a first groove width Jb1, second groove width Jb2 and third groove width Jb3 (Jb1>Jb2>Jb3). In order to increase the edge of the middle axial grooves 4b without deteriorating the snow-ejecting performance, the third groove width Jb3 is preferably set in a range of not less than 0.5 mm, more preferably not less than 1 mm, but not more than 5 mm, more preferably not more than 4 mm.

The second groove width Jb2 is preferably set in a range of not less than 150%, more preferably not less than 200%, but not more than 300%, more preferably not more than 250% of the third groove width Jb3.

The first groove width Jb1 is preferably set in a range of not less than 150%, more preferably not less than 200%, but not more than 300%, more preferably not more than 250% of third groove width Jb3.

Furthermore, it is also preferable that, with respect to each of the middle axial grooves 4b, a bent part 4bw in the inner groove segment 4b1 is disposed on one of the groove walls, and a bent part 4bw in the outer groove segment 4b2 is disposed on the other groove wall. Thereby at least one of the bent parts 4bw can surely contact with the road surface at the time of driving (traction) as well as braking to improve the on-ice performance.

In the embodiment shown in FIG. 3, the outer shoulder block piece B2b is provided with a cut-off part P on the corner between the narrow circumferential groove 5 and the outer groove segment 4b2. The depth of the cut-off part P is preferably not less than 10%, more preferably not less than 20%, but not more than 40%, more preferably not more than 30% of the groove depth Ug1 of the inner circumferential groove 3a. such cut-off part P can increase the shear strength of show column (snow grip). Also the cut-off part P can prevent snow from staying in the intersecting part between the narrow circumferential groove 5 and middle axial groove 4b.

Comparison Tests

Studless tires of size 205/60R15 for passenger cars having the tread patterns shown in FIG. 1 and FIG. 4 and the specifications shown in Table 1 were made and tested for the on-ice performance, on-snow performance and uneven wear resistance.

The specifications of the tread patterns are as follows, wherein the land ratio was changed by changing the widths underlined in the following list.

---

Tread width TW: 165 mm
Inner circumferential grooves 3a
  groove width Tg1: 5.9 mm
  groove depth Ug1: 8.9 mm
Outer circumferential grooves 3b
  groove width Tg2: 5.4 mm
  groove depth Ug2: 8.7 mm
Narrow circumferential grooves 5
  groove width Tg3: 2.8 mm
  groove depth Ug3: 6.0 mm
Crown axial grooves 4a
  Narrow groove segment 4a1
    <u>groove width Ja1: 1.5 to 2 mm</u>
    groove depth Ka1: 6.2 mm
  wide groove segments 4a2
    <u>maximum width Ja2: 5 to 7 mm</u>
    groove depth Ka2: 7.5 mm
Middle axial grooves 4b
  <u>1st groove width Jb1: 7 to 10 mm</u>
  <u>2nd groove width Jb2: 4 to 6 mm</u>
  <u>3rd groove width Jb3: 2 to 3 mm</u>
  Inner groove segments 4b1
    groove depth Kb1: 6.5 mm
  Outer groove segments 4b2
    groove depth Kb2: 8.7 mm
shoulder axial grooves 4c
  <u>groove width Jc1: 6 to 8 mm</u>
  groove depth Kc1: 8.7 mm
Sipes S
  groove width: 0.4 mm
  groove depth: 2 to 8 mm
Cut-off parts P
  maximum depth: 2 mm

---

* On-ice and on-snow performance test

A front engine rear drive 2000 cc passenger car of Japanese make provided on all of the four wheels with test tires was run on an icy road surface and snowy road surface of a tire test course, and the test driver evaluated on-ice and on-snow performances based on steering responsiveness, cornering stability, grip and the like.

The results are shown in Table 1 by an index based on Ref. 1 tire being 100, wherein the larger the value, the better the performance.

Wear Resistance Test

After running on a dry asphalt road for 8,000 km by the use of the above-mentioned test car, with respect to each of the block rows BL1, BL2 and BL3, three blocks located at different circumferential positions were measured for the amount of wear. The measurements was made at the circumferential edges and center of each block. With respect to each block measured, a difference between the amount of wear at the center and a mean value of the amounts of wear at the two edges was calculated. Then, as the measure of uneven wear of the tire, the mean value of all of the calculated differences was obtained.

The results are shown in Table 1, wherein the inverse numbers of the mean values are indicated by an index based on Ref. 1 being 100. The larger the value, the better the uneven wear resistance.

TABLE 1

| | Tire | | | | | | | | | |
|---|---|---|---|---|---|---|---|---|---|---|
| | Ref. 1 | Ref. 2 | Ref. 3 | Ref. 4 | Ex. 1 | Ex. 2 | Ex. 3 | Ex. 4 | Ex. 5 | Ex. 6 |
| Tread pattern | FIG. 1 | FIG. 1 | FIG. 1 | FIG. 1 | FIG. 1 | FIG. 1 | FIG. 1 | FIG. 1 | FIG. 1 | FIG. 4 |
| Land ratio | | | | | | | | | | |
| Entire tread portion | 0.70 | 0.75 | 0.65 | 0.70 | 0.70 | 0.70 | 0.70 | 0.70 | 0.70 | 0.70 |
| Crown region (1) | 0.71 | 0.76 | 0.66 | 0.63 | 0.73 | 0.73 | 0.73 | 0.77 | 0.79 | 0.73 |
| Middle region (2) | 0.72 | 0.77 | 0.76 | 0.79 | 0.68 | 0.68 | 0.68 | 0.66 | 0.63 | 0.68 |
| Shoulder region (3) | 0.69 | 0.74 | 0.64 | 0.74 | 0.70 | 0.70 | 0.70 | 0.73 | 0.74 | 0.70 |
| (1) − (2) | −0.01 | −0.01 | −0.10 | −0.16 | 0.05 | 0.05 | 0.05 | 0.11 | 0.16 | 0.05 |
| (3) − (2) | −0.03 | −0.03 | −0.12 | −0.05 | 0.02 | 0.02 | 0.02 | 0.07 | 0.11 | 0.02 |
| Distance | | | | | | | | | | |
| W1 (mm) | 13 | 13 | 13 | 13 | 13 | 13 | 13 | 13 | 13 | 13 |
| W2 (mm) | 52 | 52 | 52 | 52 | 52 | 52 | 52 | 52 | 52 | 52 |
| W3 (mm) | 1.5 | 1.5 | 1.5 | 1.5 | 1.5 | 0.0 | −5.0 | 1.5 | 1.5 | 1.5 |
| Test results | | | | | | | | | | |
| On-ice performance | 100 | 110 | 90 | 95 | 105 | 105 | 105 | 110 | 110 | 100 |
| On-snow performance | 100 | 80 | 120 | 95 | 110 | 105 | 100 | 100 | 100 | 110 |
| Uneven wear resistance | 100 | 100 | 100 | 95 | 100 | 100 | 100 | 100 | 92 | 100 |

The invention claimed is:

1. A studless tire comprising
a tread portion having tread edges and an overall land ratio of from 0.65 to 0.75,
the tread portion provided with
a pair of axially inner longitudinal grooves extending continuously in the circumferential direction of the tire and disposed one on each side of the tire equator,
a pair of axially outer longitudinal grooves extending continuously in the circumferential direction of the tire and disposed one between each said inner longitudinal groove and the adjacent tread edge, and
a plurality of sipes disposed in each of land portions defined by the axially inner and outer longitudinal grooves,
wherein
a land ratio of a crown region and a land ratio of a shoulder region are each larger than a land ratio of a middle region,
wherein
the crown region is defined between the groove center lines of the axially inner longitudinal grooves,
the middle region is defined between the groove center line of one of said axially inner longitudinal grooves and the groove center line of the adjacent axially outer longitudinal groove, and
the shoulder region is defined between the groove center line of one of the axially outer longitudinal grooves and the adjacent tread edge,
the land ratio of the crown region is 0.72 to 0.78,
the difference in the land ratio between the crown region and the middle region is not more than 0.15, and
the difference in the land ratio between the shoulder region and the middle region is not more than 0.15,
wherein
said crown region is provided with crown lateral grooves extending between the axially inner longitudinal grooves and arranged at intervals in the circumferential direction of the tire so as to form a crown block row of circumferentially arranged crown blocks,
said middle region is provided with middle lateral grooves extending between the axially outer longitudinal groove and the axially inner longitudinal groove and arranged at intervals in the circumferential direction of the tire so as to form a middle block row of circumferentially arranged middle blocks,
said shoulder region is provided with shoulder grooves extending between the axially outer longitudinal groove and the tread edge and arranged at intervals in the circumferential direction of the tire so as to form a shoulder block row of circumferentially arranged shoulder blocks,
each said crown lateral groove is made up of
a narrow central groove segment crossing the tire equator and having a substantially constant width, and
a pair of wide lateral groove segments each extending from one of the ends of the narrow central groove segment while gradually increasing in groove width,
the groove width of the narrow central groove segment measured in the tire circumferential direction is in a range of from 0.5 to 4 mm, the maximum groove width of the wide lateral groove segment is not less than two times and not more than six times the groove width of the narrow central groove segment when measured in the tire circumferential direction, the narrow central groove segment has a depth less than the depth of the wide groove segments and in a range of from 50 to 90% of the depth of the axially inner circumferential grooves, and the angle of the narrow central groove segment is more than 0 degrees and not more than 30 degrees with respect to the tire axial direction, the middle block row is provided with a narrow longitudinal groove extending continuously in the circumferential direction of the tire, the narrow longitudinal groove is a straight groove having straight and parallel circumferential edges along the entire circumference of the tire and has a groove width smaller than those of the axially inner and outer longitudinal grooves, each said shoulder block is provided with a plurality of zigzag sipes which are a closed circumstantial sipe having closed ends within the block, and axially inside of the circumferentially-extending zigzag sipe, closed axial sipes having closed ends within the block and semi-open axial sipes extending axially outwardly from the axially inner circumferential edge of the shoulder block and terminating before the circumstantial sipe, and no sipe is disposed on the axially outside of the closed circumstantial sipe.

2. The studless tire as set forth in claim 1, wherein
the axial distance between the groove center line of said inner longitudinal groove and the tire equator is not less than 6.0% and not more than 10.0% of the tread width, and the axial distance between the groove center line of said outer longitudinal groove and the tire equator is not less than 28.0% and not more than 35.0% of the tread width.

3. The studless tire as set forth in claim 1, wherein
the groove center line of the narrow longitudinal groove is positioned on the tire equator side of a widthwise center line of the middle block row.

4. The studless tire as set forth in claim 3, wherein
each said middle lateral groove is composed of
an axially outer groove segment extending between the axially outer longitudinal groove and the narrow longitudinal groove and inclined with respect to the tire axial direction, and an axially inner groove segment extending between the axially inner longitudinal groove and the narrow longitudinal groove and inclined with respect to the tire axial direction oppositely to the axially outer groove segment.

5. The studless tire as set forth in claim 3 or 4, wherein
the groove width of each said middle lateral groove is decreased stepwise towards the crown region.

6. The studless tire as set forth in claim 4, wherein
said axially outer groove segment has a depth more than that of said axially inner groove segment.

7. The studless tire as set forth in claim 3, wherein
the number of said crown lateral grooves is equal to the number of said middle lateral grooves in each middle region.

8. The studless tire as set forth in claim 1, wherein
each said middle block is provided with a plurality of sipes all of which extend from circumferential edges of the block.

9. The studless tire as set forth in claim 1, wherein
each said crown block is provided with a plurality of sipes all of which extend from circumferential edges of the block.

10. The studless tire as set forth in claim 1, wherein
each said middle block is provided with a plurality of sipes all of which extend from circumferential edges of the block, and each said crown block is provided with a plurality of sipes all of which extend from circumferential edges of the block.

* * * * *